(12) United States Patent
Schlagel (10) Patent No.: US 7,395,919 B2
(45) Date of Patent: Jul. 8, 2008

(54) CONVEYOR

(75) Inventor: William A. Schlagel, 14235 London St. NE., Ham Lake, MN (US) 55304

(73) Assignee: William A. Schlagel, Ham Lake, MN (US)

( * ) Notice: Subject to any disclaimer, the term of this patent is extended or adjusted under 35 U.S.C. 154(b) by 0 days.

(21) Appl. No.: 11/879,223

(22) Filed: Jul. 16, 2007

(65) Prior Publication Data

US 2008/0011584 A1   Jan. 17, 2008

Related U.S. Application Data

(63) Continuation of application No. 11/047,353, filed on Jan. 31, 2005, now Pat. No. 7,243,782.

(60) Provisional application No. 60/540,459, filed on Jan. 30, 2004.

(51) Int. Cl.
*B65G 21/00* (2006.01)

(52) U.S. Cl. .................... 198/816; 198/813; 198/860.3; 198/861.1

(58) Field of Classification Search ................ 198/813, 198/816, 860.3, 861.1
See application file for complete search history.

(56) References Cited

U.S. PATENT DOCUMENTS

| | | | |
|---|---|---|---|
| 3,878,937 A * | 4/1975 | Glaser et al. ................. | 198/835 |
| 3,921,793 A * | 11/1975 | Hutchinson et al. ......... | 198/813 |
| 4,230,222 A | 10/1980 | Clark | |
| 4,544,061 A | 10/1985 | Crandall | |
| 5,022,514 A * | 6/1991 | Lofberg ....................... | 198/813 |
| 5,067,608 A | 11/1991 | McLellan | |
| 5,609,238 A * | 3/1997 | Christensen ................. | 198/583 |
| 5,797,481 A * | 8/1998 | Uber et al. ................... | 198/813 |
| 6,044,965 A | 4/2000 | Clark | |
| 6,102,195 A | 8/2000 | Weikel | |
| 6,273,244 B1 | 8/2001 | Dingeldein et al. | |
| 6,298,981 B1 * | 10/2001 | Hosch et al. ................. | 198/813 |
| 6,405,855 B1 | 6/2002 | Peltier et al. | |
| 6,516,941 B1 | 2/2003 | Buhne | |
| 6,575,292 B2 | 6/2003 | Swinderman | |
| 6,601,692 B2 | 8/2003 | Schaefer et al. | |

(Continued)

OTHER PUBLICATIONS

InterSystems IS Roller FLO; Enclosed Belt Conveyor Systems Brochure; 6 pages; Undated.

(Continued)

*Primary Examiner*—Douglas A Hess
(74) *Attorney, Agent, or Firm*—Patterson Thuente Skaar & Christensen, P.A.

(57) ABSTRACT

An enclosed belt conveyor having a high strength take-up section that maintains proper belt alignment with the use of just two take-up screws, while still allowing for the take up section housing to be made of lighter weight, less expensive materials. The take-up section of the present invention can be installed at a head section or tail section of an enclosed belt conveyor. The take-up section of the present invention generally includes two support arms slidably mounted in guides that maintain the support arms in a straight orientation and two take-up screws that adjust the support arms within the guides while maintaining proper alignment of the take-up section without the necessity of separate leveling screws.

4 Claims, 6 Drawing Sheets

U.S. PATENT DOCUMENTS

| | | | | |
|---|---|---|---|---|
| 6,619,473 B2 * | 9/2003 | Romeo | ................... | 198/836.1 |
| 6,752,261 B1 * | 6/2004 | Gaeddert et al. | ......... | 198/861.1 |
| 7,004,308 B2 * | 2/2006 | Parks et al. | ................ | 198/812 |
| 7,243,787 B2 * | 7/2007 | Iwasa et al. | ................ | 206/219 |
| 2003/0183493 A1 | 10/2003 | Ertel et al. | | |

OTHER PUBLICATIONS

Hi Roller® Enclosed Belt Conveyors Brochure; 8 pages; Undated.

InterSystems IS Roller FLO; Enclosed Belt Conveyor Systems Brochures; 8 pages; Undated.

Hi Roller® Enclosed Belt Conveyors Application Design Manual; Oct. 19, 2001; 17 pages.

* cited by examiner

Prior Art

FIG. 1

Prior Art

FIG. 8

CONVEYOR

This application is a continuation of U.S. patent application Ser. No. 11/047,353, now U.S. Pat. No. 7,243,782 filed Jan. 31, 2005 entitled "Conveyor" which claims the benefit of U.S. Provisional Patent Application Ser. No. 60/540,459, filed Jan. 30, 2004. All of the above applications and any appendices attached thereto are incorporated by reference herein.

FIELD OF THE INVENTION

The present invention relates to belt conveyors. More particularly, the present invention relates to tensioners located at the end of belt conveyors with spool shaped rollers that are used for to convey grain and other granular materials.

BACKGROUND OF THE INVENTION

Figure 1:
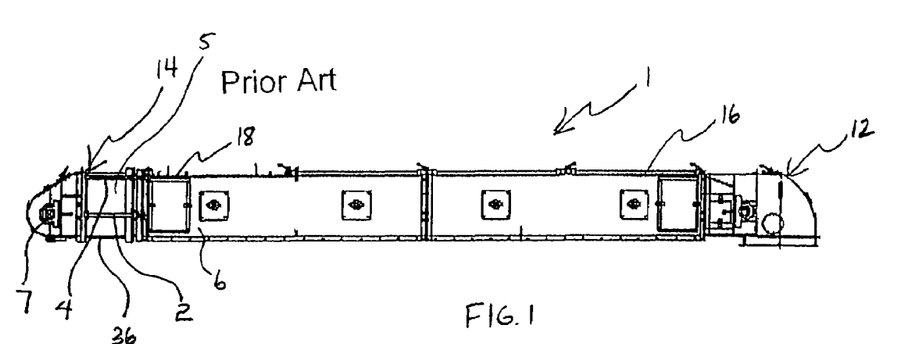
FIG. 1 is a side plan view of a prior art enclosed belt conveyor.
Figure 2:
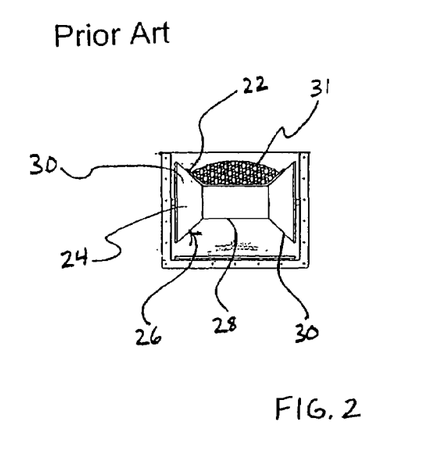
FIG. 2 is a sectional view of an enclosed belt conveyor.

Referring to FIGS. 1 and 2, enclosed belt conveyors 1 are utilized for the safe, gentle and efficient handling of dry bulk granular materials. Totally enclosed belt conveyors have the advantage of containing dust and spilled materials and automatically reloading spilled material back onto the belt. In addition, they protect conveyed materials from contamination and degradation from environmental factors. Enclosed belt conveyors often incorporate a plurality of spool shaped idler rollers 24 to provide a trough shaped support for the conveyor belt 22. The use of spool shaped idler rollers provides a contoured support for the continuous belt which carries granular materials 31.

Enclosed belt conveyors typically include a head section 12, a tail section 14 and a number of sections intermediate between the head section and the tail section. Typically, the motor and drive mountings are located at or near the head or discharge end of the conveyor. A tail (or non-drive end) section is located at the inlet end of the conveyor. In addition, any number of intermediate sections may be placed between the head section and the tail section to create a complete conveyor assembly. An endless belt runs from the tail section to the head section, and loops around a pulley and a shaft at each end. Enclosed belts conveyors may be several hundred feet long. Consequently, the endless belts will be approximately double the length of the conveyor assembly.

All belts stretch over time. The belts used in enclosed belt conveyors tend to stretch more dramatically during their initial break-in period. However, belts continue to stretch throughout their life. One way to compensate for belt stretch, in an otherwise still usable belt, is to cut out a section of the belt and to resplice the cut ends together thus shortening the belt. Shortening a belt by splicing is a time consuming and labor-intensive process that requires that the conveyor be inoperative while the splicing is performed. It is not uncommon for a long belt to stretch several feet during its life. Therefore, it is necessary to provide for adjustment in the conveyor assembly to take up the slack that develops in a belt as it stretches and also to provide adjustment when the belt is shortened.

Although a take-up may consist of a simple movable bearing mount for the shaft and pulley it is complicated in this instance by the requirement to maintain a fully enclosed conveyor structure.

Referring to FIG. 1, a typical prior art belt tensioner used with an enclosed belt conveyor includes an inner sleeve attached to the tail end of the conveyor and an outer sleeve that is part of a tail end section of the conveyor. The inner sleeve 5 telescopes into the outer sleeve 6 and is supported by the outer sleeve. The tensioner further includes four long bolts, threaded rods or screws. Two of these long bolts are typically referred to as tail take-up screws 2 and the other two as leveling screws 4. The tail take-up screws are located on the centerline of the tail shaft bearings 7. The tail take-up screws 2 are tightened equally to tension the belt and to compensate for belt stretch. The tail take-up screws 2 must be tightened equally to prevent misalignment of the pulleys that cause belt-tracking problems. The tail section leveling screws 4 are typically located above the centerline of the tail shaft bearings. The leveling screws 4 are used to level the tail section to compensate for misalignment that occurs when the tail take-up screws 2 are adjusted to properly tension the belt and to compensate for belt stretch. The leveling screws 4 are not used for tightening the belt. The above described arrangement is typically referred to as a sliding box tail. A take-up section may also be located at the head end of the conveyor if desired or rarely at an intermediate location.

Other prior art conveyors utilize take-up sections with sliding bearing mounts and take-up screws. In this arrangement, the bearings for the end roller in the head or tail section are mounted in a plate that is slidably mounted to the conveyor housing. A screw mechanism is used to slide the plate axially related to the longitudinal axis of the conveyor to tension and compensate for slack in the belt. The length of the section in which it is located limits the adjustment distance available in a sliding bearing mount arrangement.

All of these prior art take-up sections have the disadvantage that the weight and tension of the conveyor belt and its contents are born by the housing of the take-up section. Therefore, the take-up section housing must be very robustly constructed to resist the tension of the belt, the weight of the housing, shaft, pulleys and bearings in addition to the tension of the belt which may be thousands of pounds. Heavy housing components are costly. Further, take-up sections that utilize both take-up screws and leveling screws require the proper adjustment of at least four bolts in order to properly adjust and position the take-up section. If these adjustments are improperly made, the belt will track improperly, wear excessively and have a shortened life. Thus, it would be a benefit to the enclosed belt conveyor industry if belt tensioning could be accomplished without the need for both take-up screws and leveling screws and if take-up sections could be constructed of lighter weight materials.

SUMMARY OF THE INVENTION

The present invention solves most of the above problems by providing an enclosed belt conveyor having a high strength take-up section that maintains proper belt alignment with the use of just two take-up screws, while still allowing for the take-up section housing to be made of lighter weight, less expensive materials. The take-up section of the present invention can be installed at a head section or tail section of an enclosed belt conveyor. The take-up section of the present invention generally includes two support arms slidably mounted in guides that maintain the support arms in a straight orientation and two take-up screws that adjust the support arms within the guides while maintaining proper alignment of the take-up section without the necessity of separate leveling screws.

The take-up section of the present invention is conveniently installed in the tail section of an enclosed belt conveyor. However, the take-up section may be located in the head of the enclosed belt conveyor. The take-up section of the present invention generally includes two support arms, advantageously constructed from channel, that ride within two longitudinal guides. Desirably, the take-up screws of the present invention are located inside the take-up arms and are connected to the guides.

The support arms are slidingly supported within the guides, desirably on ultra high molecular weight polyethylene bearing blocks. The support arms of the present invention support a bearing mount. The bearing mount typically extends perpendicular to the longitudinal axis of each support arm. The bearing support, in turn, carries bearings that support the tail pulley of an enclosed belt conveyor. The bearings are desirably in the form of pillow blocks.

DETAILED DESCRIPTION OF THE INVENTION

Referring to FIGS. 3-8, an enclosed belt conveyor 10 generally includes head section 12, tail section 14, head section 16, tail section 18 and may include a plurality of intermediate sections 20. The head section 12 is the end of the enclosed belt conveyor at which conveyed materials are discharged. The tail section 14 is the end of the enclosed belt conveyor 10 at which conveyed material is deposited on the belt for transport.

Enclosed belt conveyor 10 generally includes a conveyor belt 22 supported by a plurality of rollers 24 essentially as is illustrated in Prior Art FIG. 2. An exemplary spool roller 26 generally includes a central body 28 and two flanges 30. Body 28 and flanges 30 together create a trough shaped depression in which conveyor belt 22 is supported. Thus, spool rollers 26 create a trough for supporting granular material 31 on conveyor belt 22. The trough can also be created by the use of a horizontal cylindrical roller and a pair of angled cylindrical rollers to support the edges of the belt, a rollerless sliding form or a slide bed conveyor as is known in the art.

Enclosed belt conveyor 10 also includes a head pulley 35 shown in phantom by dashed lines, located in head section 12 and a tail pulley 33, also shown by dashed lines in phantom, located in tail section 14. Head pulley and tail pulley support belt 22 where it reverses direction at each end of enclosed belt conveyor 10.

Figure 3:
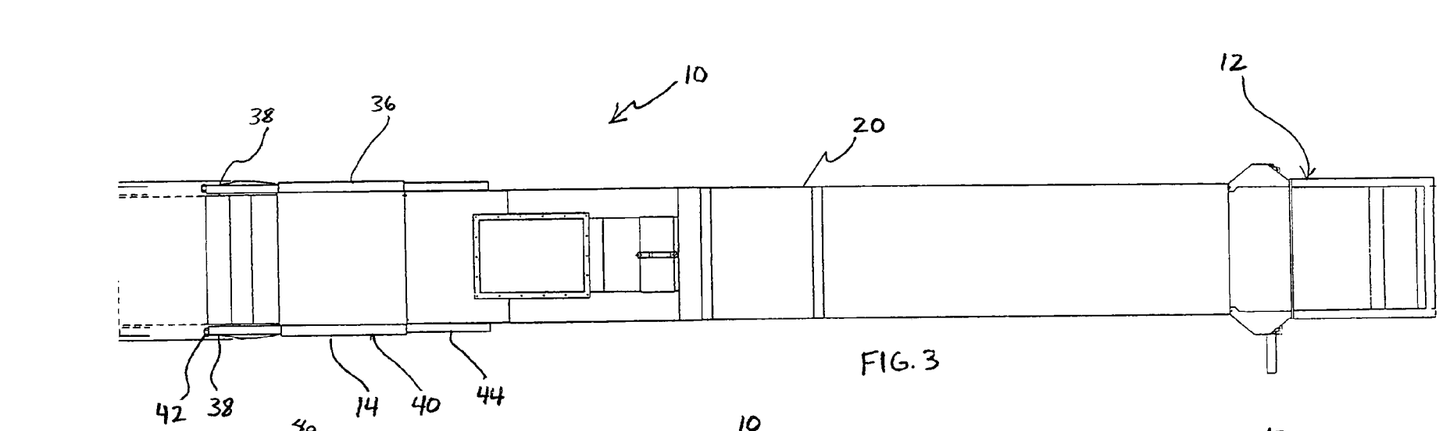
FIG. 3 is top plan view of the enclosed belt conveyor of the present invention.
Figure 4:
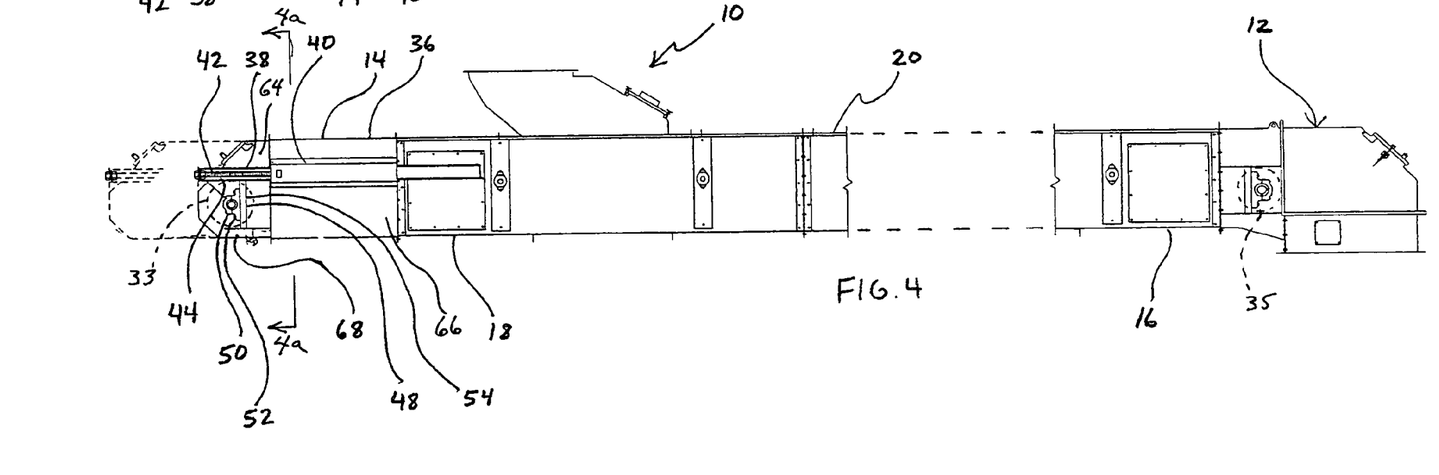
FIG. 4 is a side plan view of the enclosed belt conveyor of the present invention.

Referring to FIGS. 3 and 4, take-up section 36, in accordance with the present invention, generally includes support arms 38, guides 40 and take-up screws 42.

Figure 5:
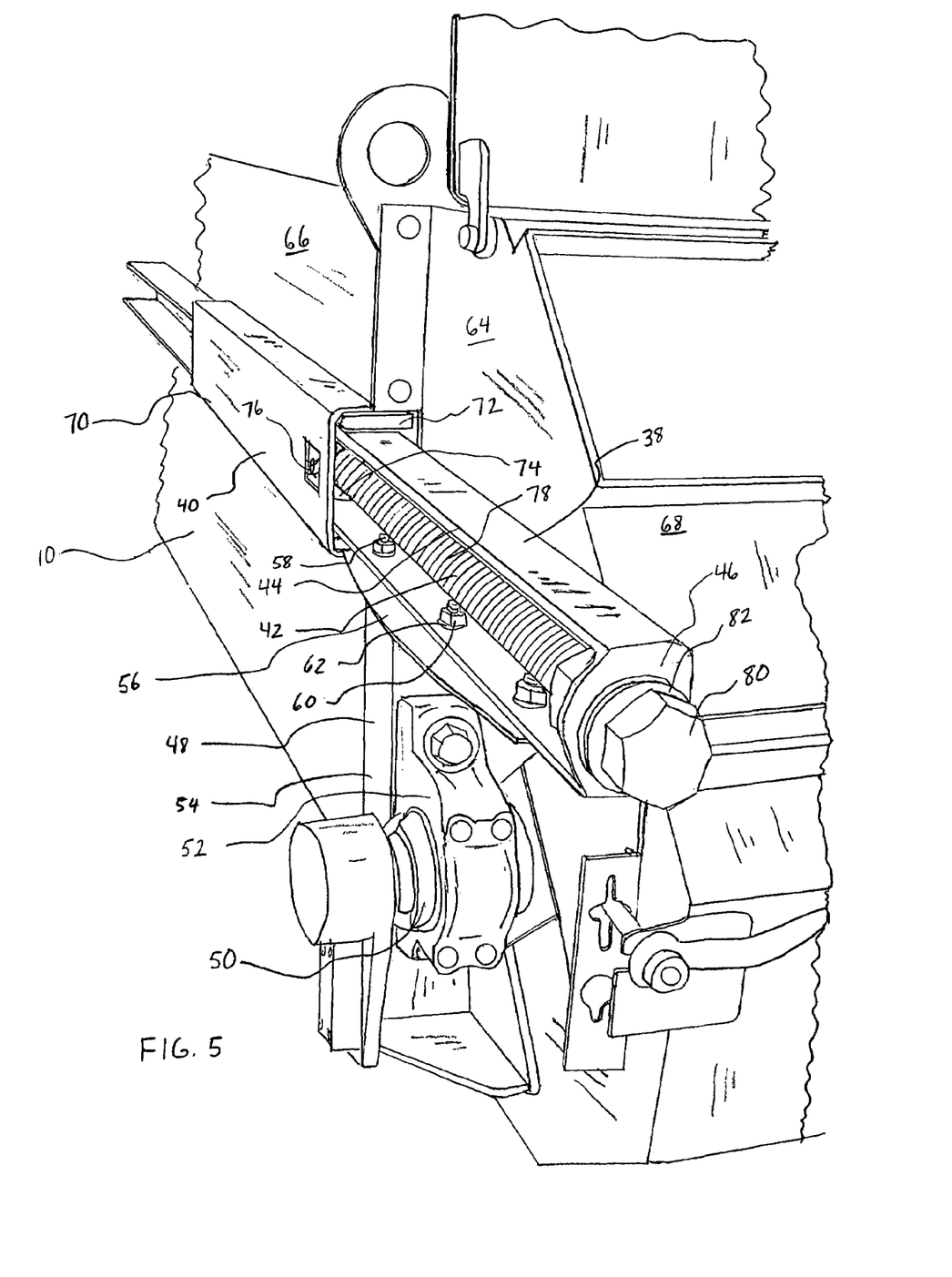
FIG. 5 is a perspective view of a take-up section in accordance with the present invention.
Figure 6:
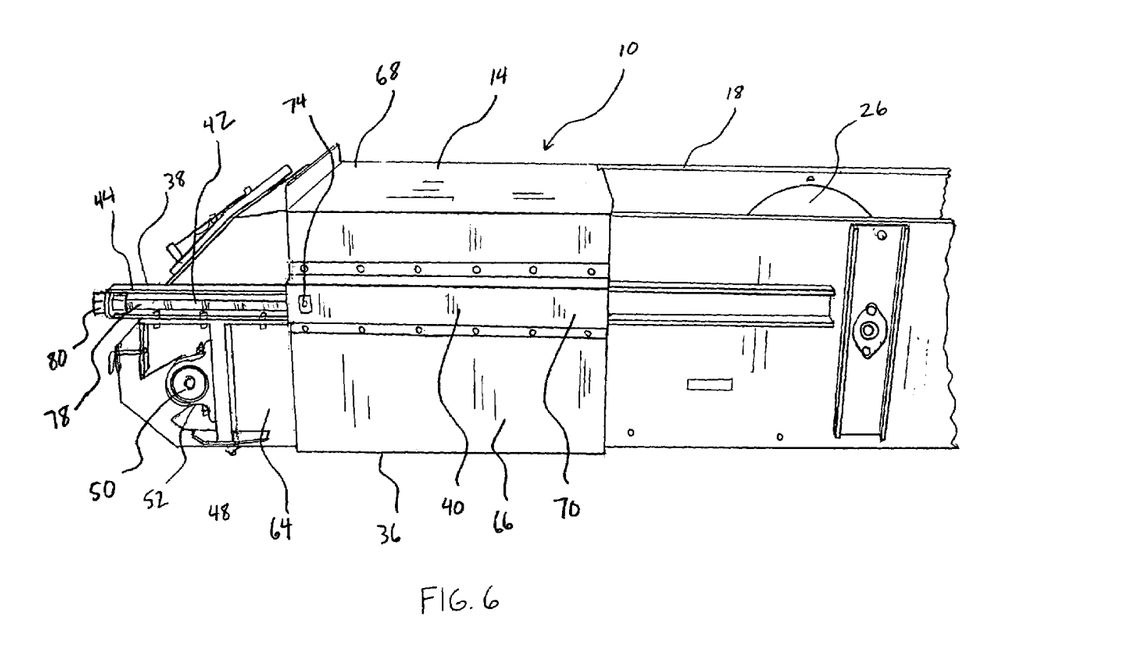
FIG. 6 is a side perspective view of a take-up section in accordance with the present invention.
Figure 7:
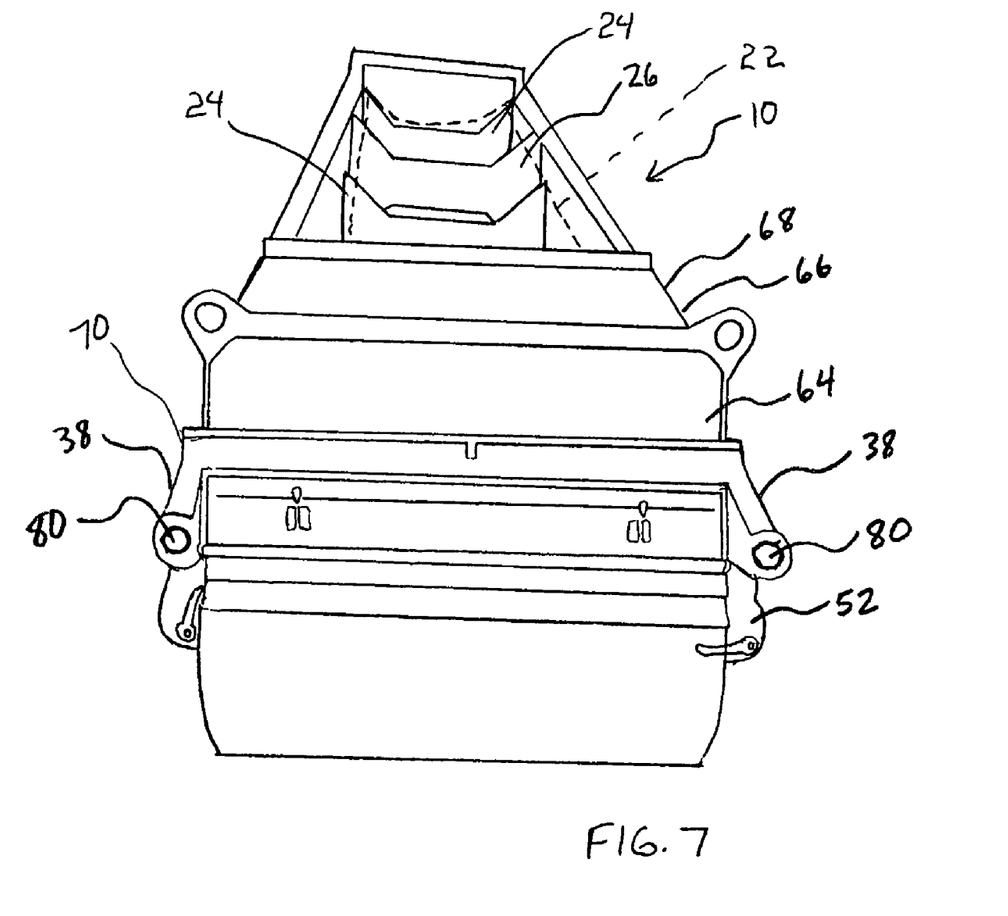
FIG. 7 is an end perspective view of a take-up section in accordance with the present invention.
Figure 8:
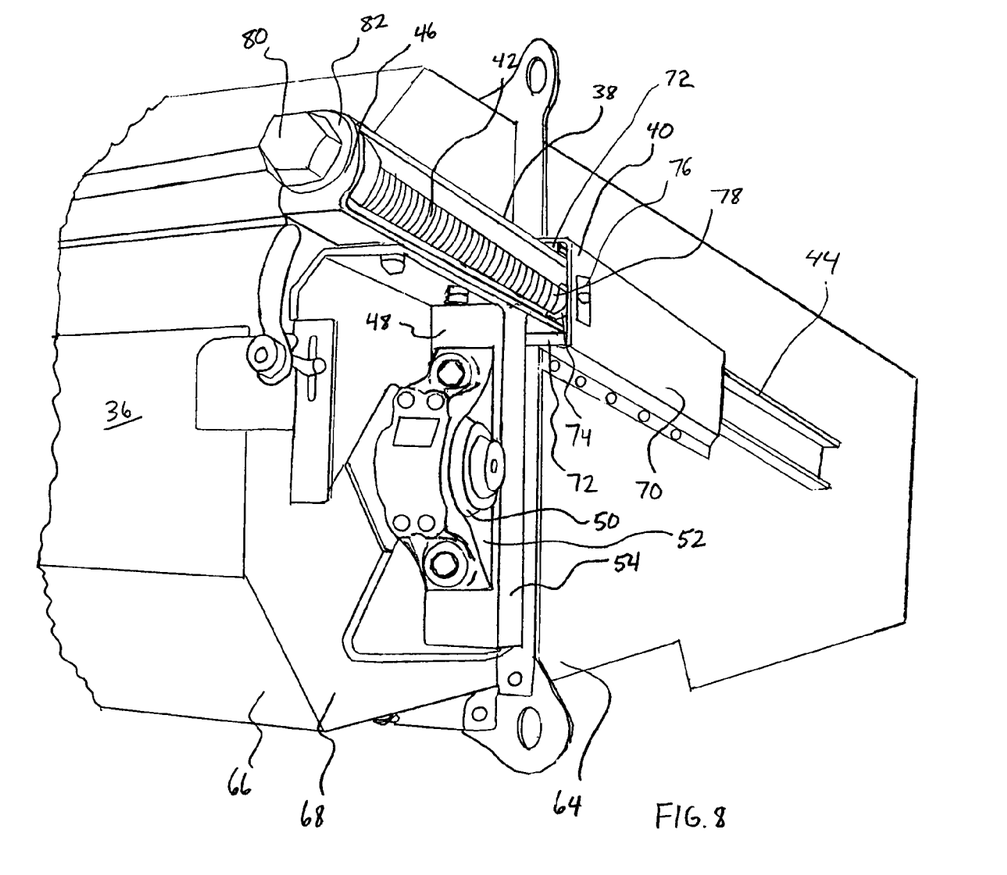
FIG. 8 is a perspective view of a take-up section in accordance with the present invention.

Referring particularly to FIG. 5, support arms 38 include channel 44 having an end partially closed by end plate 46. Channel 44 is sized to extend through guide 40 and to be slidingly supported therein. Support arms 38 further include bearing supports 48. Bearing support 48 supports bearings 50. Bearings 50 desirably are in the form of pillow blocks 52. Bearings 50 support either head pulley (not shown) or tail pulley (not shown) depending upon the location of take-up section 36. As depicted in FIGS. 5, 6 and 8, bearing support 48 may include a square tube 54 and flange 56. Flange 56 serves to connect square tube 54 to channel 44 desirably by use of bolts 58, nuts 60 and washers 62.

Take-up section 36 includes inner sleeve 64 and outer sleeve 66. Inner sleeve 64 is integrally formed as a part of housing 68. Housing 68 covers and protects tail section and prevents the loss of conveyed material 31, as depicted here. It is to be understood that take-up section 36 may be installed at head section 12 or tail section 14. This application will describe take-up section 36 as being installed at tail section 14, though it is to be understood that the invention can be practiced at another section of enclosed conveyor 10.

Figure 4A:
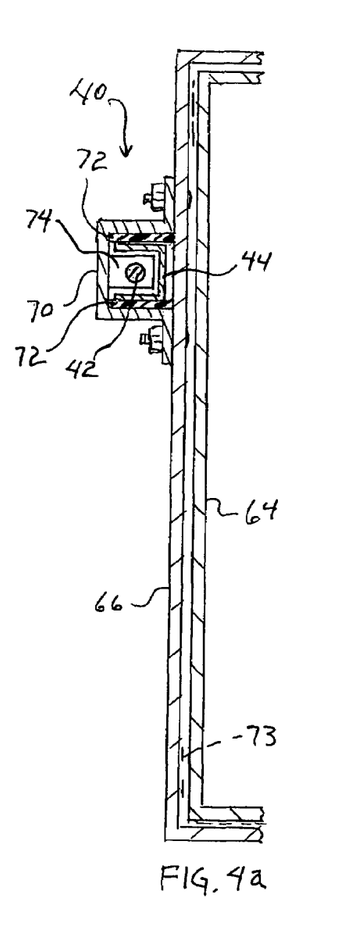
FIG. 4a is a partial cross-sectional view taken at line 4a-4a of FIG. 4.

Referring in particular to FIGS. 4a, 5 and 8, guides 40 are desirably located on the exterior of outer sleeve 66. Guides 40 generally include outer guide sleeve 70, bearing blocks 72 and fixed nut 74. Outer guide sleeve 70 is desirably affixed to the exterior of outer sleeve 66. Outer guides sleeve 70 houses a plurality of bearing blocks 72. Bearing blocks 72 bear against and support channel 44. Desirably bearing blocks 72 are formed of ultra high molecular weight polyethylene but they may be formed from other low friction materials known to those skilled in the art. The dashed lines labeled with the numeral 73 indicate spacers that may be bearings such as polyethylene or dust block material that may extend around the periphery of the inner sleeve of the two telescoping sleeves.

Outer guide sleeve 70 also supports fixed nut 74. Fixed nut 74 is typically affixed to the inside of outer guide sleeve 70 so that take-up screws 42 may be threaded into fixed nut 74. Desirably, fixed nut 74 is formed from brass or other self lubricating material. In addition, it is desirable that fixed nut 74 include zerk fitting 76. Zerk fitting 76 allows fixed nut 74 to be re-lubricated with grease, as needed.

Take-up screws 42 generally include screw shaft 78, hex head 80 and thrust washer 82. Desirably, take-up screws 42 are oversized acme screws plated for rust resistance. Hex head 80 is desirably located to allow for three hundred sixty degree wrench swing for convenience of adjustment. Thrust washer 82 bears against end plate 46 so that when hex head 80 is turned, thrust washer can apply force in either direction against end plate 46 to either extend or retract take-up section 36. Take up screws 42 may be interconnected such as by a sprocket and chain arrangement to allow for simultaneous adjustment. Take up screws 42 are exemplary and can be replaced by a hydraulic extension mechanism, a ratchet mechanism or any other mechanism for extending and retracting known to those skilled in the art.

Desirably the length of channel 44 is roughly two to two and one half times the length of outer guide sleeves 70. This allows for extended adjustment of conveyor belt 22.

Thus, as described herein, support arms 38 carry bearings 50 and thus tail pulley 34, conveyor belt 22 and its associated tension without the load being transferred to housing 68. In this fashion, support arms 38 act as an exoskeleton bearing the load that would otherwise be born by housing 68. Thus, housing 68 can be constructed of much lighter materials than in the prior art. In addition, the interrelationship between outer guide sleeve 70 and channel 44 maintains constant alignment between bearings 50 and the rest of rollers 24. Thus, it is unnecessary to use a separate leveling rod.

In operation, when it becomes necessary to tension conveyor belts 22, an operator simply places a wrench on hex head 80 of take-up screws 42 and turns take-up screws 42 each in equal number of turns to extend take-up section 36 to create a desired belt tension and take-up excess length of the belt created by stretching. In addition, those skilled in the art can readily see that take-up screws 42 could easily be interconnected by a chain and sprocket linkage or another linkage to allow simultaneous adjustment.

The present invention may be embodied in other specific forms without departing from the spirit or essential attributes thereof, and it is, therefore, desired that the present embodiments be considered in all respects as illustrative and not restrictive.

The invention claimed is:

1. An enclosed belt conveyor assembly, comprising:
   an outer enclosed sleeve assembly, comprising:
   a pair of outer guides fixed to sides of the outer enclosed sleeve;
   an internally threaded member secured to each outer guide; and
   a plurality of bearing surfaces fixed to an inner portion of each outer guide;
   an inner enclosed sleeve assembly in operable slidable telescopic interaction internal to the outer enclosed sleeve, the inner enclosed sleeve assembly comprising:
   an enclosure;
   a take-up pulley on an axle, the take-up pulley supporting a continuous conveyor belt;
   a pair of bearings supporting the axle of the take-up pulley;
   a pair of support arms secured to sides of the enclosure, each support arm comprising:
   a bearing support operably supporting the bearing;
   an at least partially hollow support member that extends through the outer guide that is fixed to the outer enclosed sleeve, the support member slidably engaging the plurality of bearing surfaces to support the inner enclosed sleeve in substantially parallel telescopic relation to the outer enclosed sleeve assembly;
   a take up assembly operably connected to the support member and to the outer guide sleeve on the outer enclosed sleeve at an inboard portion; and
   a threaded actuator operably engaged to the internally threaded member and to the take up assembly at an outboard portion of the support member.

2. The assembly of claim 1, wherein the outer sleeve is fixed to at least one of a head section or a tail section of the enclosed belt conveyor.

3. The enclosed belt conveyor belt take-up assembly, as claimed in claim 1, wherein the support arms are aligned so that their long axes do not intersect the pair of bearings.

4. The enclosed belt conveyor assembly as claimed in claim 1, in which the bearing surfaces comprise ultra high molecular weight polyethylene.

* * * * *